United States Patent [19]

Rodgers et al.

[11] 4,246,801
[45] Jan. 27, 1981

[54] SEMI-ACTIVE LASER SEEKER GYROSCOPE

[75] Inventors: Aubrey Rodgers; William G. Robertson, both of Huntsville, Ala.

[73] Assignee: The United States of America as represented by the Secretary of the Army, Washington, D.C.

[21] Appl. No.: 8,464

[22] Filed: Feb. 1, 1979

[51] Int. Cl.³ .................. G01C 19/12; G01C 19/20
[52] U.S. Cl. .......................... 74/5.7; 74/5 R; 74/5.5; 308/DIG. 1
[58] Field of Search .......... 74/5 R, 5.6 A, 5.5, 74/5.1, 5.12, 5.14, 5.7; 308/DIG. 1; 244/3.16

[56] References Cited

U.S. PATENT DOCUMENTS

| 3,187,588 | 6/1965 | Parker | 74/5.12 |
|---|---|---|---|
| 3,677,098 | 7/1972 | Davis | 74/5.12 |
| 3,877,317 | 4/1975 | Stripling | 74/5.6 A |
| 3,920,200 | 11/1975 | Evans et al. | 244/3.16 |
| 3,985,034 | 10/1976 | Widner | 308/DIG. 1 X |
| 4,009,848 | 3/1977 | Albert et al. | 74/5.1 X |
| 4,155,521 | 5/1979 | Evans et al. | 74/5.6 A |

Primary Examiner—Rodney H. Bonck
Attorney, Agent, or Firm—Nathan Edelberg; Robert P. Gibson; James T. Deaton

[57] ABSTRACT

A gyro in which an elastomeric material is used as a spherical bearing surface in an air bearing type gyro to sustain 12,500 g set back acceleration level during gun launch and have the capability of surviving the launch phase in a non-functioning mode and then being operative in post-launch lower-g environments as a stabilized/torquing seeker capable of tracking laser illuminated moving target so as to enable the gyro to be used for guided projectile systems.

7 Claims, 2 Drawing Figures

SEMI-ACTIVE LASER SEEKER GYROSCOPE

DEDICATORY CLAUSE

The invention described herein may be manufactured, used, and licensed by or for the Government for governmental purposes without the payment to us of any royalties thereon.

BACKGROUND OF THE INVENTION

In the past, high-g type seeker gyros have had difficulty in sustaining 12,500 g set back acceleration levels during gun launch and when this happens, gyro rotor bearing damage occurs and the gyro does not function properly. Therefore, there is a need for a gyro that has bearing surfaces such that they can withstand the high-g's imparted during gun launch and also to eliminate rotor caging or "gotcha" type machanisms that are used on presently known gyro seekers.

Therefore, it is an object of this invention to provide an air bearing type rotor gyro that has a rubber type bearing surface that can withstand high-g acceleration before being used to achieve the gyro function of the device.

Another object of this invention is to utilize a gyro that has the capability of being launched from a gun and used as a seeker for laser energy received from a target.

Other objects and advantages of this invention will be obvious to those skilled in this art.

SUMMARY OF THE INVENTION

In accordance with this invention, a spherical air bearing gyro semi-active laser seeker guidance is provided in which one of the spherical air bearing surfaces is made of a hard resilient material to withstand a high-g environment at launch in the order of 12,500-g set back acceleration levels with the resilient material being capable of surviving the launch phase in a non-functioning mode and then still be operative in post-launch lower-g environments as a stabilize/torquing seeker capable of tracking a laser illuminated moving target. This is accomplished by bonding a hard rubber material to support structure to form one of the air bearing surfaces of the spherical gyro and utilizing this hard rubber material for caging purposes as well as for an air bearing surface when the gyro is in its operative environment. The gyro seeker has other elements that make the seeker complete for responding to laser illumination from a target.

DESCRIPTION OF THE PREFERRED EMBODIMENT

Figure 1:
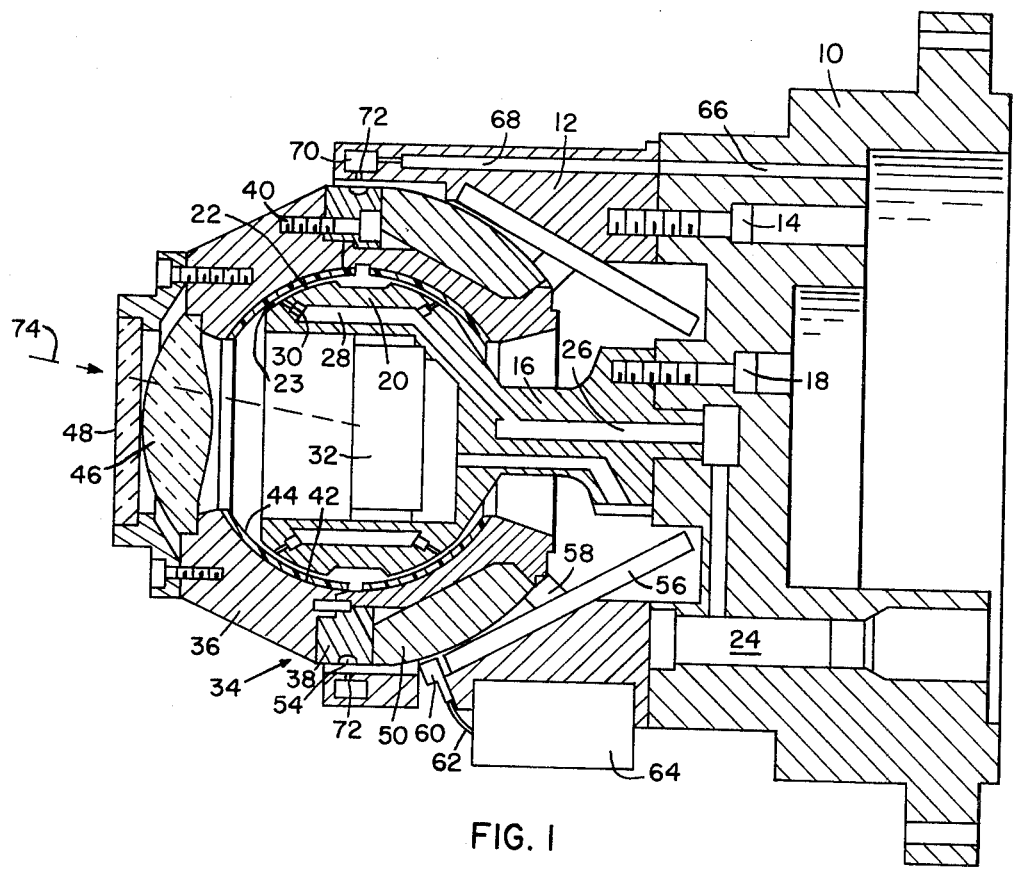
FIG. 1 is a sectional view of a gyro laser seeker, in accordance with this invention.

Referring now to the drawing, the gyro includes a base 10 to which an upper housing 12 is secured by conventional securing means 14. A stator portion 16 of the gyro is secured to base 10 by conventional securing means 18. The stator has a spherical metal head portion 20 with spherical metal surface 22 for forming one surface of an air bearing. A passage 24 in housing 10 interconnects with passage 26 in the stator and with manifold section 28 that has inherently compensated restrictors 30 opening through spherical surfaces 22 of the stator. The stator also has a detector 32 mounted therein in a conventional manner for detecting laser energy.

A rotor 34 is made in two sections 36 and 38 that are secured together in a conventional manner by a plurality of securing means 40. Rotor 34 has an inner spherical surface 42 that is made of an elastomer 44 that is bonded in a conventional manner to spherical surfaces of rotor halves 36 and 38 . Resilient material 44 can be made of such materials as neoprene, ethylene-propylene terpolymer, and etc., in which the Poisson ratio value of the resilent material is about 0.49 to about 0.5. The resilient material can have a thickness up to about thirty-thousandth's (30/1000) of an inch and a thickness of fifteen-thousandth's (15/1000) or less is preferred. Radial gap 23 between surfaces 22 and 42 can range from about 500 micro-inches to about 1000 micro-inches and 750 micro-inches is a nominal figure. Resilient material 44 is bonded to the spherical metal surfaces of halves 36 and 38 using conventional bonding material for bonding resilient materials of this type to metal. An example of such a bonding material is Chemlock. Resilient material 44 is illustrated as being mounted on rotor 34, however if desired the resilient material could be mounted on the stator with the rotor having metal spherical surfaces.

Figure 2:
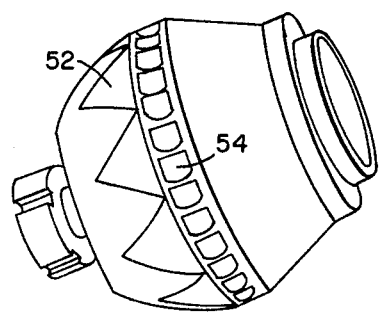
FIG. 2 is a plan view of the rotor and stator assembled to illustrate the outer structure of the rotor.

Rotor half 36 also has a lens 46 and a filter 48 secured thereto in a conventional manner as illustrated. Half 38 of rotor 34 has a permanent ring magnet 50 with reflecting and non-reflecting pick-off pattern design 52 on the rotor surface (See FIG. 2). Half 38 also has buckets 54 in the outer surface thereof for rotating the rotor up to speed. Housing section 12 has a plurality of torquing coils 56 mounted circumferentially therein and a rotor magnetic alignment circumferential coil 58 mounted therein in a conventional manner. Light emitting diode and photo-transistor pickoffs 60 are mounted on housing 12 in a conventional manner and are schematically illustrated. These pickoffs are connected through connecting means 62 to pickoff electronics 64 which process the signals and control guidance of a missile on which the gyro seeker is mounted. Passage 66 in housing 10 and passage 68 in housing 12 communicate to chamber 70 which communicates through a plurality of nozzles 72 to inject gas or fluid onto buckets 54 for bringing the rotor up to speed.

In operation, the gyro is constructed to survive high-g gun launch loads in the non-operate mode for example a 12,500 g load during launch and then after launch to have the capability of normal operation in a stabilized/torquing mode. During launch, elastomer 44 sustains the heavy rotor set-back acceleration loads applied to the rotor and stator bearing surfaces or assemblies. Elastomer 44 provides a wide enough bearing area to maintain local stresses within the elastic limits of the bearing materials. After launch, gas or fluid supplied to manifold 28 of the stator is brought up to a pressure of about 150 psig that is supplied from an external gas supply bottle through passages 24 and 26 in a conventional manner. Subsequently, gas flow exits through inherently compensating restrictors 30 to produce a gas film in radial gap 23 to provide a hydrostatic bearing surface for rotor 34. The gas or fluid from bearing gap 23 is vented at the rotor poles and equator in a conventional manner. High pressure gas or fluid is supplied to passages 66, and 68 and to manifold 70 and finally out exiting nozzles 72 and injected into rotor buckets 54 to bring rotor 34 up to design speed. At the same time spin-up buckets 54 are receiving gas or fluid to bring rotor 34 up to speed, magnetic alignment coil 58 and permanent ring magnet 50 position and maintain rotor 34 in the proper oriented nozzle bucket spin-up plane. Once the rotor is up to speed, the gas from the source supplying manifold 70 is exhausted and the rotor is released into a stablized operating mode very evenly and smoothly. With the gyro in the stablized mode, detector 32, torquing coils 56, and pick-offs 60 function to produce signals in a conventional manner in accordance with desired gyro function. The magnetic moment of torquing coils 56 and the magnetic moment of permanent ring magnet 50 are machanized so as to be used to control rotor 36 initial frame of reference. Current flowing in torquing coils 56, such as that provided from energized laser detector 32, causes rotor 36 to track a target by laser radiation 74 radiating from the target in a conventional manner. That is, the energy detected by detector 32 is connected in a conventional manner to torquing coils 56. The torque on permanent ring magnet 50 is such as to cause rotor 36 to precess in direction and rate according to the current polarity and magnitude in coils 56. Light emitting diode and photo transistor pick-offs 60 measure the relative width of the reflecting/nonreflecting triangular pattern design 52 (illustrated in FIG. 2) on the surface of rotor 34. The outputs from the pick-offs result in a pulse-duration-modulated signal proportional to rotor 34 and housing 10 tilt angle. The output signals from pick-offs 60 are fed into circuits 64 through cable 62 that cause signals to be produced for actuating a control system for guiding the missile on which the seekers is mounted. Therefore, the signals from circuits 64 adjust the stator and detector 32 therein relative to the illuminated target line of sight orientation of the gyro through the projectile or missile body. Thus, the compliant bearing seeker gyro in accordance with this invention has the capability of surviving high-g gun launch and tracking of an illuminated moving target.

We claim:

1. In a gyro adapted to withstand a high-g launching environment, the improvement comprising: a gyro stator having spherical bearing surface means, a gyro rotor rotatably mounted relative to said stator by spherical bearing surface means, one of said spherical bearing surface means being metal and the other being a resilient material bonded to support material, said resilient material having a hardness ratio of about 0.49 to about 0.5 Poisson and a thickness of about 15 to about 30 thousandth's of an inch to provide a thickness sufficient to withstand high-g launching environment of about 12,500 g load, and means in said stator for supplying fluid to said spherical bearing surface means to provide an air bearing space therebetween.

2. In a gyro as set forth in claim 1, wherein said resilient material is ethylene-propylene terpolymer.

3. In a gyro as set forth in claim 2, wherein said air bearing space is a gap of about 500 micro-inches to about 1000 micro-inches.

4. In a gyro as set forth in claim 3, wherein bucket means are provided on said rotor and means for injecting fluid onto said buckets are provided for rotating said rotor up to an operating speed.

5. In a gyro as set forth in claim 1, wherein said resilient means is mounted on said rotor and said resilient means has a thickness of about 15 thousandth's of an inch.

6. In a gyro as set forth in claim 5, wherein said resilient material is ethylene-propylene terpolymer with a Poisson ratio of about 0.49.

7. In a gyro as set forth in claim 6, wherein said air bearing space is a gap of about 750 micro-inches.

* * * * *